(12) United States Patent
Li

(10) Patent No.: US 6,334,240 B1
(45) Date of Patent: Jan. 1, 2002

(54) LACE BUCKLE DEVICE

(76) Inventor: Ying-Chi Li, No. 60, Alley 41, Lane 496, Section 1, An Ho Road, Tainan (TW)

( * ) Notice: Subject to any disclaimer, the term of this patent is extended or adjusted under 35 U.S.C. 154(b) by 0 days.

(21) Appl. No.: 09/572,333

(22) Filed: May 18, 2000

(51) Int. Cl.[7] ................................................ A45C 1/00
(52) U.S. Cl. .................. 24/115 G; 24/136 R; 24/712.1; 24/712.5
(58) Field of Search ............................ 24/115 G, 115 R, 24/136 R, 712.1, 712.2, 712.5, 115 M, 122.6; 36/501; 174/146; 439/786, 788, 816, 817

(56) References Cited

U.S. PATENT DOCUMENTS

| | | | | |
|---|---|---|---|---|
| 2,236,506 A | * | 4/1941 | Hirsch | 24/115 G X |
| 3,074,135 A | * | 1/1963 | Brodowski | 24/115 G X |
| 4,680,835 A | * | 7/1987 | Horng | 24/136 R X |
| 5,365,641 A | * | 11/1994 | Watanabe et al. | 24/115 G |
| 6,185,798 B1 | * | 2/2001 | Ton | 24/712.1 |

* cited by examiner

Primary Examiner—Robert J. Sandy
(74) Attorney, Agent, or Firm—Rosenberg, Klein & Lee

(57) ABSTRACT

A lace buckle device in the present invention includes a buckle base, an operative rod and a spring. The buckle base is provided with a central vertical hollow and a lateral hole. Two slant holes are respectively provided at the left and right sides of the lateral hole and respectively slantwise extend to and through the left and right side walls of the buckle base. A catching rim is formed on each shorter section of each slant hole in the left side wall or right side wall. The operative rod is provided with a lateral passing hole penetrating through the front and rear walls. After the spring and the operative rod being successively inserted in the central vertical hollow, each end of a lace can be inserted into each end of the slant hole in the left side wall or right side wall and out of each other end of the slant hole in the front wall, and then both ends of a lace are reversely inserted into the front end of the lateral hole and penetrate through the lateral passing hole of the operative rod and out of the rear end of the lateral hole of the buckle base so as to make two ends of a lace be firmly fastened by the clamp of the spring and the operative rod and the catch of the catching rims.

2 Claims, 8 Drawing Sheets

LACE BUCKLE DEVICE

BACKGROUND OF THE INVENTION

1. Field of the Invention

The present invention relates to a lace buckle device with innovatory convenience for firmly fastening or releasing two ends of a lace, and more particularly to a lace buckle device which can effectively prevent two ends of a lace from being pulled out by force.

2. Description of the Related Art

A rope or a lace is commonly used in our daily life. A rope can be used to tie up the mouth of a bag. A lace is applied to tie the mouth of a belted topcoat or a lace shoe for a wearer to wear comfortably. Generally, two ends of a rope or a lace would be tied to form a slipknot so as to secure the rope or lace in position. When one end of the rope or lace being pulled, the slipknot will easily be untied. However, there are many drawbacks by means of tying a slipknot for securing a rope or lace in position. For example, it wastes time and is troublesome to tie a slipknot, and a slipknot is easy to be loosened or to become a fast knot and is not beautiful.

A conventional lace buckle device has been invented to overcome the drawbacks of tying a slipknot to fasten two ends of a rope or a lace. Referring to FIG. 8, the conventional lace buckle device includes a buckle base 80 and an operative rod 90. An opening 81 is formed on the top of the buckle base 80. A central hollow 82 is provided in the interior of the buckle base 80, but the central hollow 82 does not penetrate through the bottom of the buckle base 80. Two opposite passing holes 83 are provided in the side wall of the buckle base 80. A top tray 91 is provided on the top of the operative rod 90, and a protruding rod 92 is provided on the bottom of the top tray 91. A passing hole 921 is provided to penetrate through the front and rear side walls of the protruding rod 92, and below each end of the passing hole 921 is provided with a stopping strip 922. A protruding block 923 is provided on the bottom of the protruding rod 92.

Referring to FIG. 9, while being assembled, a spring 93 is placed into the central hollow 82 of the buckle base 80, and then the operative rod 90 is inserted in the central hollow 82 with the direction of the passing hole 921 being in accordance with that of each passing hole 83. At the same time, each stopping strip 922 is forced to pass the opening 81 and stop against each passing hole 83 so as to make the protruding rod 92 be caught in the central hollow 82. Because of the elasticity of the spring 93, the passing holes 83 and the passing hole 921 are slightly staggered, and the passing holes 83 do not respectively wholly lap over each end of the passing hole 921. After the top tray 91 of the operative rod 90 being pressed down, the operative rod 90 will move downward to make the passing hole 921 accord with the passing holes 83, and then two ends of a rope or a lace 94 can penetrate through the overlapped passing holes 83 and 921. When the top tray 91 being released, referring to FIG. 10, two ends of a rope or a lace 94 will be fastened to prevent from being pulled out by means of the stagger of the passing holes 83 and 921.

However, there are still drawbacks in the above-mentioned conventional lace buckle device although it is more convenient to be operated and beautiful to look than a slipknot tied by hands. The conventional lace buckle device can function to fasten or release two ends of a lace by means of the spring 93 and the operative rod 90 which cooperate to change the positions of the passing hole 921, but, when two ends of the lace being clamped by the spring 93 and the operative rod 90, they can still be easily pulled out of the buckle device by forceful pulling. It can not have the perfect efficiency to fasten two ends of a lace.

SUMMARY OF THE INVENTION

Therefore, the present invention is to provide a lace buckle device that substantially obviates the drawbacks of the related conventional art.

An object of the present invention is to provide a lace buckle device that is convenient for operating to fasten or release two ends of a lace.

Another object of the present invention is to provide a lace buckle device whose catching rims of both slant holes improve perfect efficiency to prevent two ends of a lace from being pulled out by forceful pulling while in clamped condition.

To achieve these advantages, a lace buckle device in the present invention includes a buckle base, an operative rod and a spring. The buckle base is provided with a central vertical hollow, and a lateral hole is provided to penetrate through the centers of the front and rear walls of the buckle base. Two slant holes are respectively provided at the left and right sides of the lateral hole and respectively slantwise extend to and through the left and right side walls of the buckle base. A catching rim is formed on each shorter section of each slant hole in the left side wall or right side wall. The operative rod is provided with a lateral passing hole penetrating through the front and rear walls. After the spring and the operative rod being successively inserted in the central vertical hollow, each end of a lace can be inserted into each end of the slant hole in the left side wall or right side wall and out of each other end of the slant hole in the front wall, and then both ends of a lace are reversely inserted into the front end of the lateral hole and penetrate through the lateral passing hole of the operative rod and out of the rear end of the lateral hole of the buckle base so as to make two ends of a lace be firmly fastened by the clamp of the spring and the operative rod and the catch of the catching rims.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
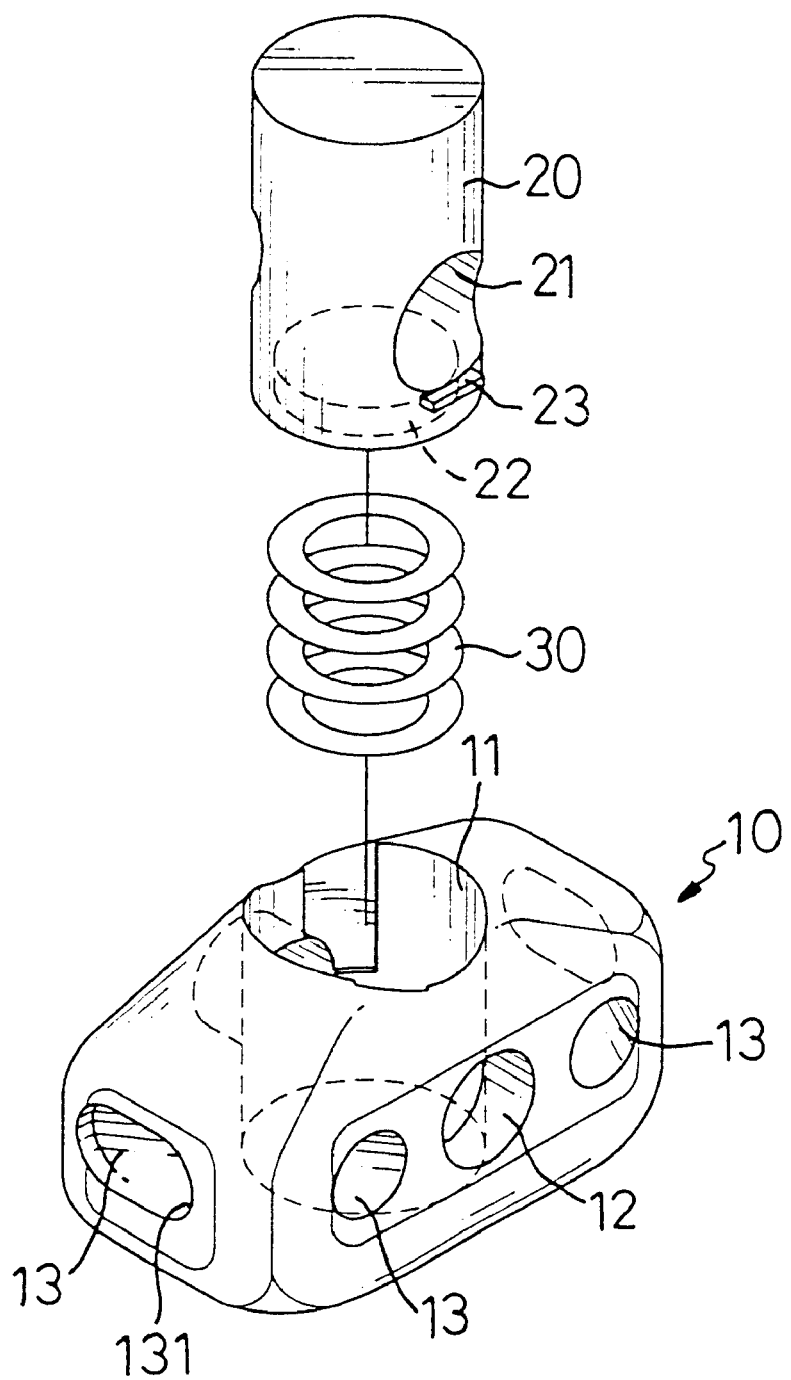
FIG. 1 is a perspective exploded view of an embodiment of the lace buckle device in accordance with the present invention.

Referring to FIG. 1, an embodiment of the lace buckle device in the present invention includes a buckle base 10, an operative rod 20 and a spring 30. The buckle base 10 is integrally formed and provided with a central vertical hollow 11 extending downward but not penetrating through the bottom of the buckle base 10. A lateral hole 12 is provided to penetrate through the centers of the front and rear walls of the buckle base 10, and the lateral hole 12 connects with the central vertical hollow 11. Two slant holes 13 are respectively provided at the left and right sides of the lateral hole 12, and two slant holes 13 respectively slantwise extend to and through the left and right side walls of the buckle base 10. A catching rim 131 is formed on each shorter section of each slant hole 13 in the left side wall or right side wall. The operative rod 20 is provided with a lateral passing hole 21 penetrating through the front and rear walls. A protruding block 22 is provided on the bottom of the operative rod 20, and a stopping strip 23 is provided below each end of the lateral passing hole 21 of the operative rod 20.

Figure 2:
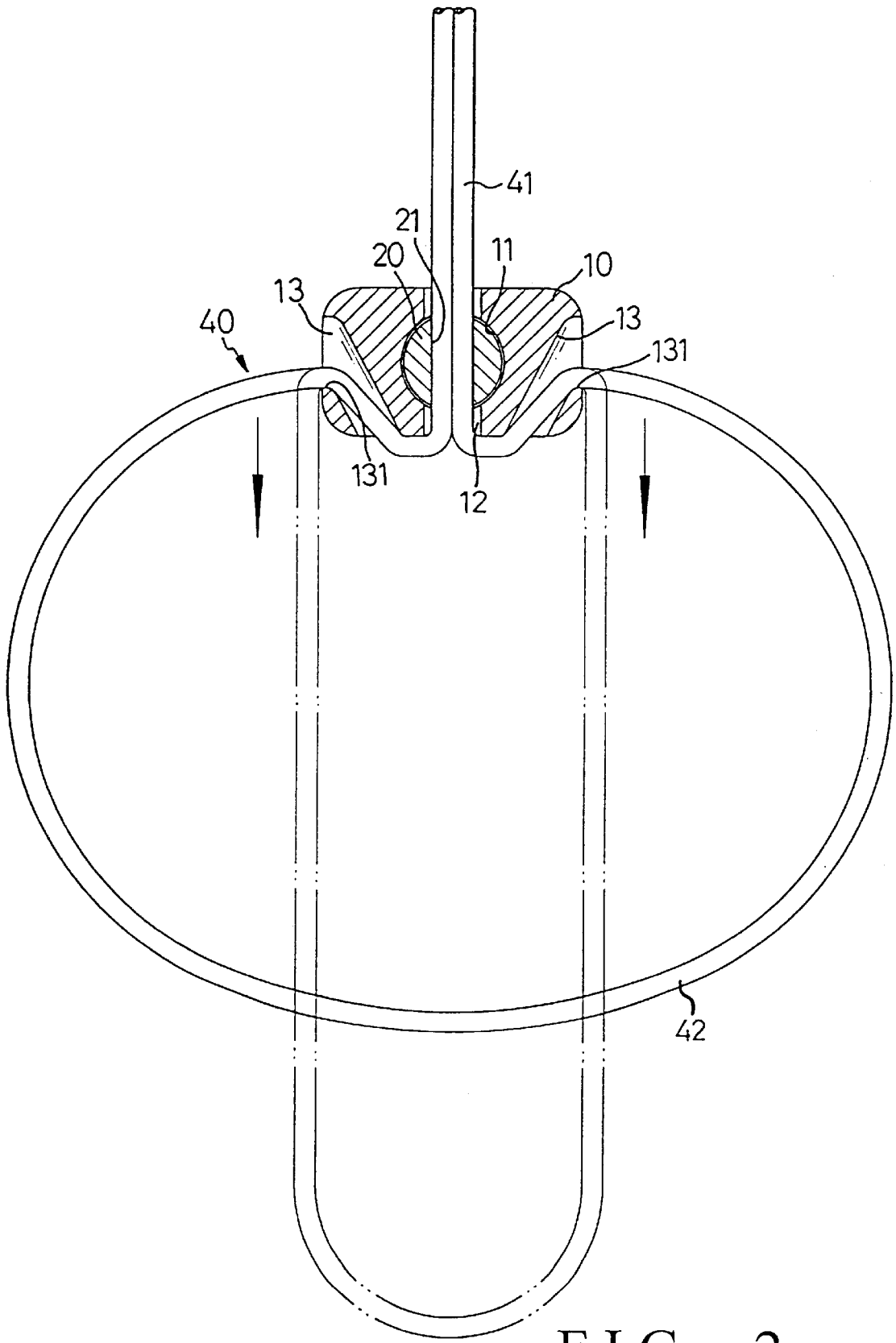
FIG. 2 is a top sectional view of an embodiment of the lace buckle device in an assembled configuration being penetrated by two ends of a lace in accordance with the present invention.

While being assembled, the spring 30 is placed in the central vertical hollow 11 of the buckle base 10, and then the operative rod 20 is pushed down to insert into the central vertical hollow 11 with each stopping strip 23 stopping in each end of the lateral hole 12 of the buckle base 10 so as to form the buckle device in the present invention. Referring to FIG. 2, each end 41 of a rope or a lace 40 is inserted into each end of the slant hole 13 in the left side wall or right side wall and out of each other end of the slant hole 13 in the front wall of the buckle base 10, and then both ends 41 of the rope or lace 40 are reversely inserted into the front end of the lateral hole 12 of the buckle base 10. At the same time, the operative rod 20 is pressed down to let both ends 41 of the rope or lace 40 penetrate through the lateral passing hole 21 of the operative rod 20 and out of the rear end of the lateral hole 12 of the buckle base 10 so as to finish assembly of the buckle device and the rope or lace 40.

Figure 3:
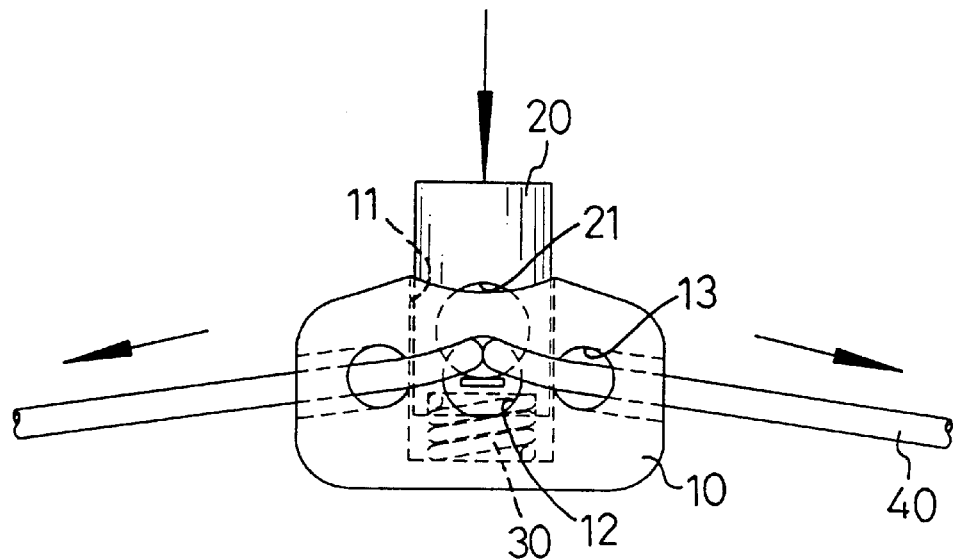
FIG. 3 is a schematic side sectional view of an embodiment of the lace buckle device in an assembled configuration being pressed down to release two ends of a lace in accordance with the present invention.
Figure 4:
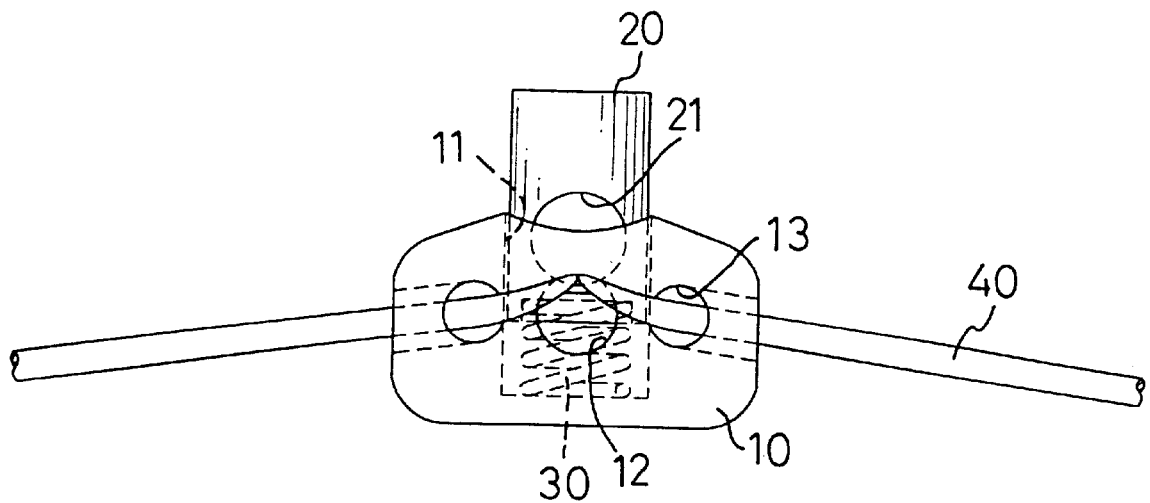
FIG. 4 is a schematic side sectional view of an embodiment of the lace buckle device in an assembled configuration with two ends of a lace being clamped and fastened in the lace buckle device in accordance with the present invention.

Referring to FIGS. 3 and 4, the operative rod 20 will always be kept upward by the elasticity of the spring 30, as shown in FIG. 4, so as to clamp and fasten two ends 41 of the rope or lace 40 by means of the stagger of the lateral passing hole 21 of the operative rod 20 and the lateral hole 12 of the buckle base 10. When the operative rod 20 being pressed down to make the lateral passing hole 21 lap over the lateral hole 12, as shown in FIG. 3, two ends 41 of the rope or lace 40 can be released and pulled out.

Figure 5:
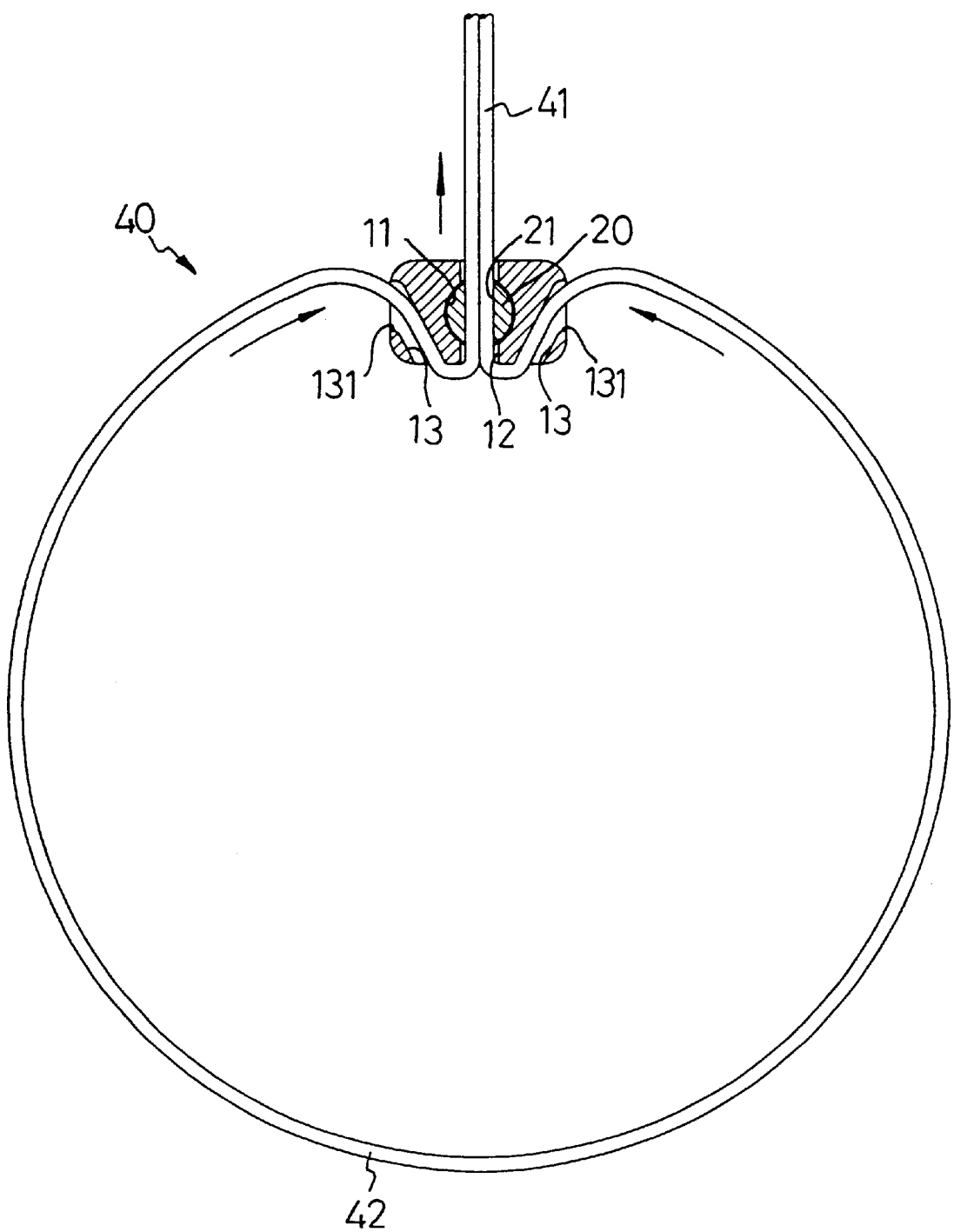
FIG. 5 is a top sectional view of an embodiment of the lace buckle device in an assembled configuration being penetrated by two ends of a lace in accordance with the present invention.

The characteristic of the buckle device in the present invention lies in the special design of the slant holes 13 of the buckle base 10. While two ends 41 of the rope or lace 40 being clamped by the cooperation of the operative rod 20 and the spring 30 to make the lateral passing hole 21 and the lateral hole 12 be staggered, two ends 41 of the rope or lace 40 can not be pulled out of the lateral hole 12 even if the ring portion 42 of the rope or lace 40 is forcefully pulled because the rope or lace 40 will be prevented from moving by both catching rims 131 of the slant holes 13, as shown in FIG. 2. If both ends 41 of the rope or lace 40 being forcefully pulled outward, referring to FIG. 5, the reverse pulling force can make the rope or lace 40 be released from the catching rims 131, and the ring portion 42 will be tightened.

Figure 6:
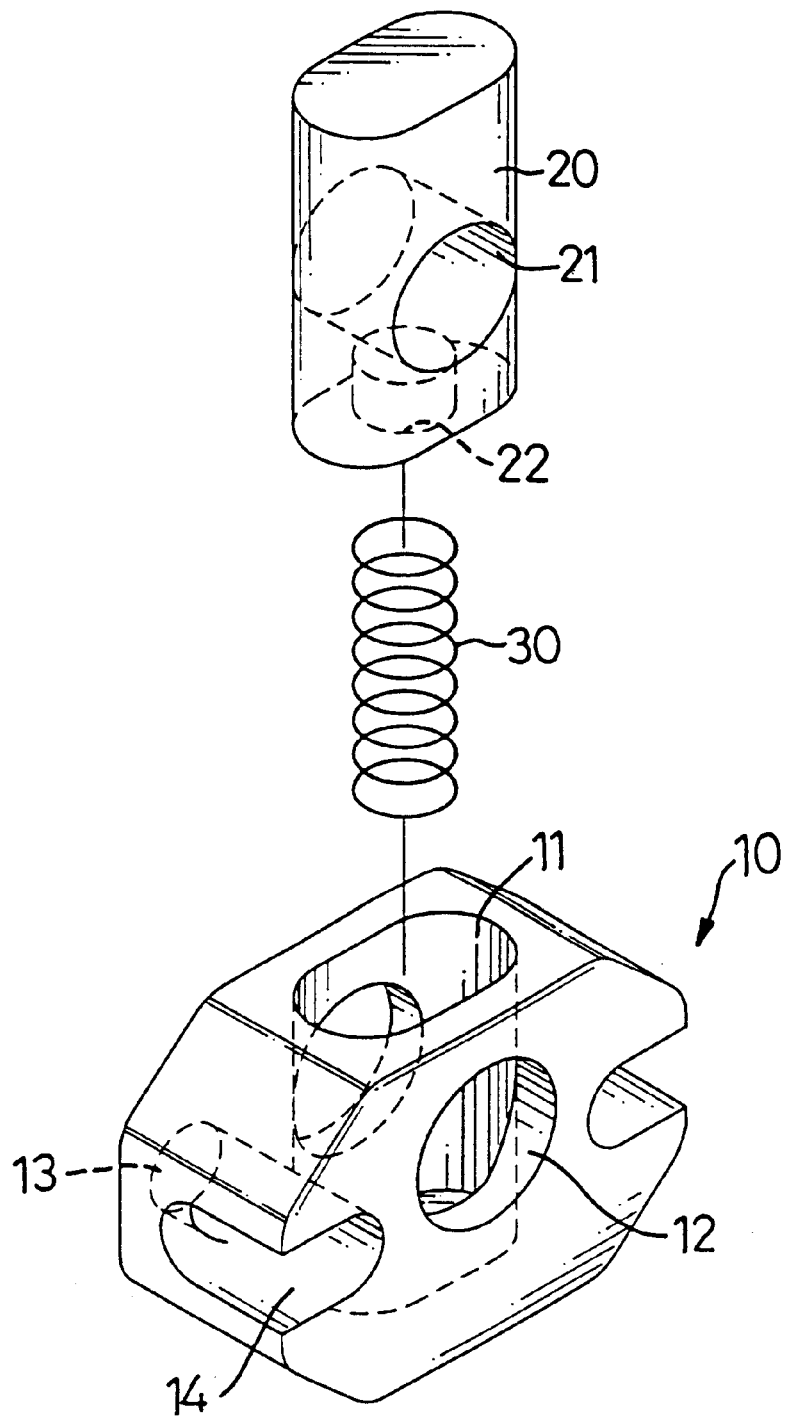
FIG. 6 is a perspective exploded view of another embodiment of the lace buckle device in accordance with the present invention.

Referring to FIG. 6, another embodiment of the lace buckle device in the present invention is assembled by the same parts with those of the above-mentioned embodiment of the present invention. It includes a buckle base 10, an operative rod 20 and a spring 30. Its characteristic variation lies in the lateral U-shaped grooves 14 respectively provided in the left and right side walls and the front wall of the buckle base 10. A passing hole 13 is provided in the bottom of each lateral U-shaped groove 14 and penetrates through the rear wall of the buckle base 10.

Figure 7:
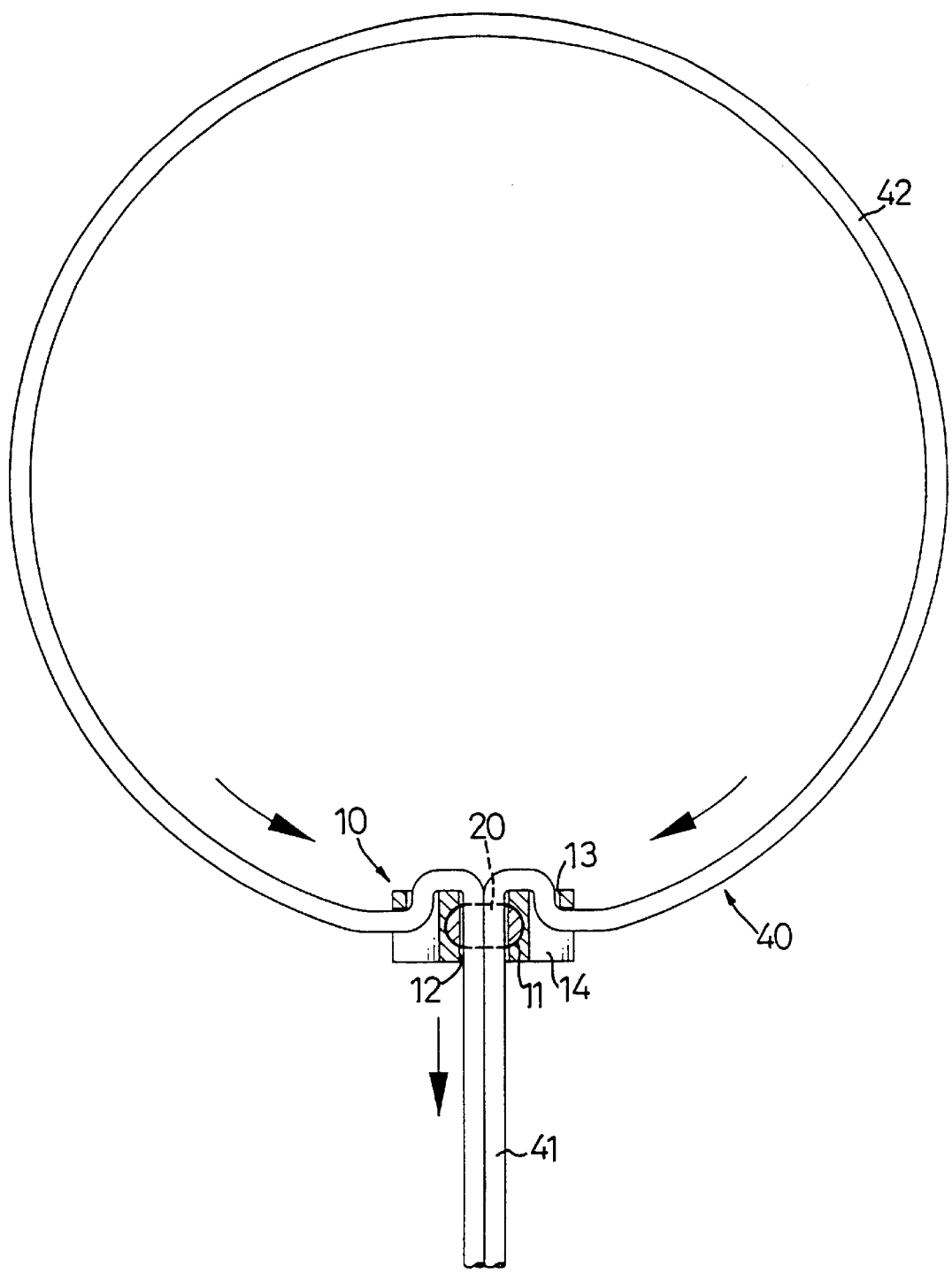
FIG. 7 is a top sectional view of another embodiment of the lace buckle device in an assembled configuration being penetrated by two ends of a lace in accordance with the present invention.
Figure 8:
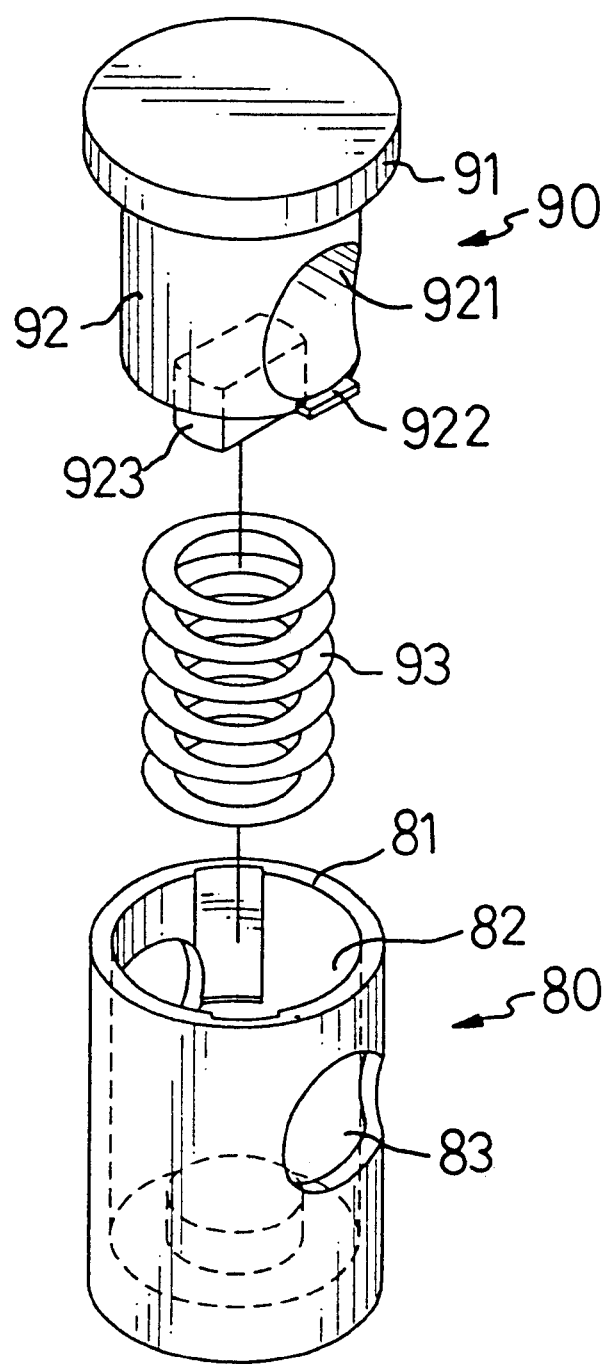
FIG. 8 is a perspective exploded view of a conventional lace buckle device.
Figure 9:
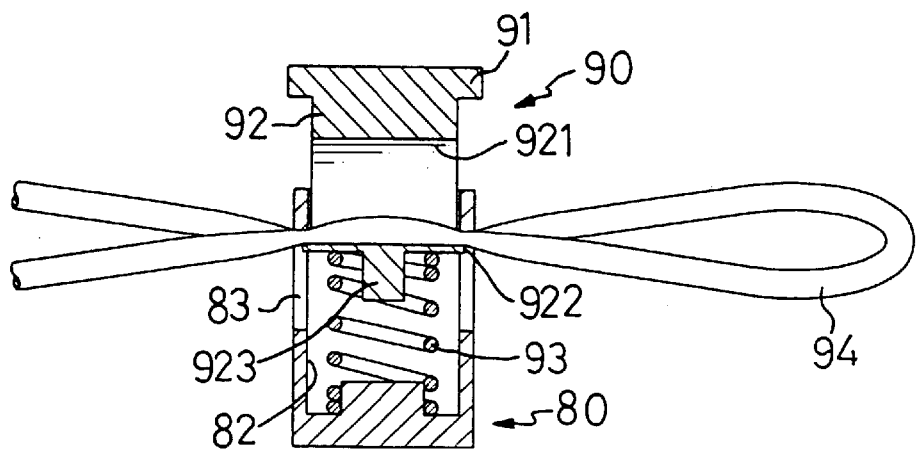
FIG. 9 is a side sectional view of the conventional lace buckle device in an assembled configuration clamping two ends of a lace; and, FIG. 10 is a side sectional view of the conventional lace buckle device in an assembled configuration being pressed down to release two ends of a lace.
Figure 10:
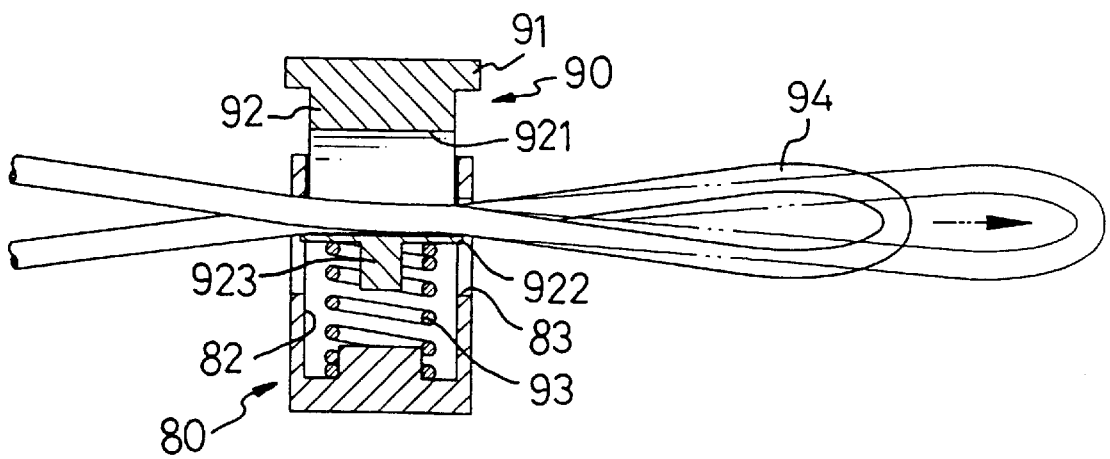

While being assembled, the spring 30 is placed in the central vertical hollow 11 of the buckle base 10, and then the operative rod 20 is pushed down to insert into the central vertical hollow 11 to make the protruding block 22 on the bottom of the operative rod 20 be caught in the top of the spring 30. Referring to FIG. 7, each end 41 of a rope or lace 40 is inserted into either lateral U-shaped groove 14, penetrates through the passing hole 13 and then reversely penetrates through the rear end of the lateral hole 12 of the buckle base 10. At the same time, the operative rod 20 is pressed down to let both ends 41 of the rope or lace 40 penetrate through the lateral passing hole 21 of the operative rod 20 and out of the rear end of the lateral hole 12 of the buckle base 10 so as to finish assembly of the buckle device and the rope or lace 40.

While the preferred embodiments of the invention have been described above, it will be recognized and understood that various modifications may be made therein and the appended claims are intended to cover all such modifications which may fall within the spirit and scope of the invention.

What is claimed is:

1. A lace buckle device comprising:
   a buckle base being provided with a central vertical hollow extending downward, a lateral hole being provided to penetrate through centers of front and rear walls of said buckle base, two slant holes being respectively provided at the left and right sides of said lateral hole, said two slant holes respectively slantwise extending to and through the left and right side walls of said buckle base, a catching rim being formed on each shorter section of each said slant hole in the left side wall or right side wall, a spring and an operative rod being successively inserted in said central vertical hollow, and said operative rod being provided with a lateral passing hole penetrating through front and rear walls of the operative rod; while being used, each end of a lace being inserted into each end of said slant hole in the left side wall or right side wall and out of each other end of said slant hole in the front wall, and then both ends of a lace being reversely inserted into the front end of said lateral hole and penetrating through said lateral passing hole of said operative rod and out of the rear end of said lateral hole of said buckle base so as to make two ends of a lace be firmly fastened by the clamp of said spring and said operative rod and the catch of said catching rims.

2. A lace buckle device as claimed in claim 1, wherein the characteristic variation of another preferred embodiment of said buckle base lies in two lateral U-shaped grooves, said two lateral U-shaped grooves being respectively provided in the left and right side walls and the front wall of said buckle base, a passing hole being provided in the bottom of each said lateral U-shaped groove and penetrating through the rear wall of said buckle base; while being used, each end of a rope or lace being inserted into said either lateral U-shaped groove, penetrating through said passing hole and then reversely penetrating through the rear end of said lateral hole of said buckle base and said lateral passing hole of said operative rod and out of the rear end of the lateral hole of said buckle base.

* * * * *